(12) United States Patent
Lee

(10) Patent No.: US 8,601,797 B2
(45) Date of Patent: Dec. 10, 2013

(54) EXHAUST DEVICE FOR DIESEL VEHICLE

(75) Inventor: Jin Ha Lee, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 442 days.

(21) Appl. No.: 12/623,255

(22) Filed: Nov. 20, 2009

(65) Prior Publication Data

US 2011/0047977 A1 Mar. 3, 2011

(30) Foreign Application Priority Data

Aug. 31, 2009 (KR) ........................ 10-2009-0077381

(51) Int. Cl.
*F01N 3/00* (2006.01)

(52) U.S. Cl.
USPC .................... 60/295; 60/301; 60/286; 60/311

(58) Field of Classification Search
USPC .................................. 60/286, 295, 301, 311
See application file for complete search history.

(56) References Cited

U.S. PATENT DOCUMENTS

| 6,919,047 | B1* | 7/2005 | He et al. ........................ 422/122 |
| 6,935,105 | B1* | 8/2005 | Page et al. ....................... 60/298 |
| 6,955,042 | B1* | 10/2005 | Wnuck et al. .................... 60/286 |
| 7,240,484 | B2* | 7/2007 | Li et al. ........................... 60/286 |
| 7,485,271 | B2* | 2/2009 | Golunski et al. ............ 423/213.2 |
| 7,562,522 | B2* | 7/2009 | Yan ................................. 60/286 |
| 2004/0045285 | A1* | 3/2004 | Penetrante et al. .............. 60/286 |
| 2004/0050037 | A1* | 3/2004 | Betta et al. ........................ 60/286 |
| 2004/0128985 | A1* | 7/2004 | Shimasaki et al. .............. 60/286 |
| 2005/0103000 | A1* | 5/2005 | Nieuwstadt et al. ............. 60/286 |
| 2006/0277897 | A1 | 12/2006 | Stone |
| 2007/0012032 | A1* | 1/2007 | Hu ................................... 60/286 |
| 2007/0089406 | A1* | 4/2007 | Doring ............................ 60/295 |
| 2008/0034736 | A1* | 2/2008 | Chiba et al. ..................... 60/291 |
| 2008/0066455 | A1* | 3/2008 | Viola ............................... 60/286 |
| 2008/0072575 | A1* | 3/2008 | Yan ................................. 60/284 |
| 2008/0115485 | A1* | 5/2008 | Lee ................................. 60/276 |
| 2008/0120964 | A1* | 5/2008 | Suzuki et al. ................... 60/285 |
| 2008/0148714 | A1* | 6/2008 | Komatsu et al. ................ 60/287 |
| 2009/0255236 | A1* | 10/2009 | Collier et al. ................... 60/297 |
| 2009/0288400 | A1* | 11/2009 | Kim et al. ........................ 60/297 |
| 2010/0107610 | A1* | 5/2010 | Schussler et al. ............... 60/287 |
| 2010/0251700 | A1* | 10/2010 | Wan et al. ....................... 60/287 |
| 2011/0005199 | A1* | 1/2011 | Kammer et al. ................. 60/274 |
| 2011/0011068 | A1* | 1/2011 | Ren et al. ........................ 60/297 |
| 2011/0052452 | A1* | 3/2011 | Choi .............................. 422/169 |
| 2011/0061367 | A1* | 3/2011 | Laermann et al. .............. 60/277 |
| 2011/0072790 | A1* | 3/2011 | Schmieg et al. ................ 60/277 |
| 2012/0137663 | A1* | 6/2012 | Lee et al. ........................ 60/287 |

FOREIGN PATENT DOCUMENTS

| DE | 10 2006 062 085 A1 | 5/2008 |
| DE | 10 2009 044 272 A1 | 2/2011 |
| JP | 8-261052 A | 10/1996 |
| JP | 10-205322 A | 8/1998 |

(Continued)

*Primary Examiner* — Thomas Denion
*Assistant Examiner* — Patrick Maines
(74) *Attorney, Agent, or Firm* — Morgan, Lewis & Bockius LLP

(57) ABSTRACT

An exhaust device for a diesel vehicle may include a diesel fuel catalyst provided downstream of a turbocharger, a hydrocarbon Selective Catalyst Reduction (SCR) catalyst provided downstream of the diesel fuel catalyst, a catalyst-coated diesel particulate filter provided downstream of the hydrocarbon SCR catalyst, and a secondary fuel injector provided on an exhaust gas pipe between the turbocharger and the diesel fuel catalyst.

1 Claim, 2 Drawing Sheets

(56) References Cited

FOREIGN PATENT DOCUMENTS

| | | | | |
|---|---|---|---|---|
| JP | 2002295244 A | * | 10/2002 | ............ F01N 3/08 |
| JP | 2007222819 A | * | 9/2007 | |
| JP | 2007315372 A | * | 12/2007 | |
| JP | 2008075610 A | * | 4/2008 | |
| JP | 2010281266 A | * | 12/2010 | |
| JP | 2012127302 A | * | 7/2012 | |
| KR | 10-2008-0026520 A | | 3/2008 | |
| KR | 10-2008-0045912 A | | 5/2008 | |
| KR | 10-0857338 B1 | | 9/2008 | |
| KR | 10-2008-0088406 A | | 10/2008 | |
| KR | 10-2008-0114684 A | | 12/2008 | |
| KR | 10-0888310 B1 | | 3/2009 | |
| WO | WO 2007049851 A1 | * | 5/2007 | |

\* cited by examiner

EXHAUST DEVICE FOR DIESEL VEHICLE

CROSS REFERENCE TO RELATED APPLICATION

The present application claims priority to Korean Patent Application Number 10-2009-0077381 filed on Aug. 31, 2009, the entire contents of which application is incorporated herein for all purposes by this reference.

BACKGROUND OF THE INVENTION

1. Field of the Invention

The present invention relates to an exhaust device for a diesel vehicle.

2. Description of Related Art

An exhaust device for a diesel vehicle is equipped with a variety of diesel after-treatment devices including a Diesel Oxidation Catalyst (DOC), a Diesel Particulate Filter (DPF), a Selective Catalytic Reduction (SCR) catalyst, a Lean NOx Trap (LNT), etc. The diesel after-treatment devices also include a hydrocarbon SCR(HC-SCR) catalyst using diesel fuel as a reducing agent.

The DOC mainly serves to oxidize hydrocarbons and CO, and is used to oxidize soot in a Diesel Particulate Filter (DPF) by oxidizing NO into $NO_2$ or to obtain a specific ratio of NO to $NO_2$, which can raise the efficiency of urea SCR.

In addition, the urea SCR, the most common of SCR methods, generally uses Fe or the like. The efficiency of the urea SCR is sensitive to the $NO/NO_2$ ratio and is highest when the $NO/NO_2$ ratio is on the order of 1.

Also, the LNT is advantageous in that a system for supplying a reducing agent is not necessary since fuel is supplied as a reducing agent even though its efficiency is lower than that of the urea SCR.

Accordingly, the urea SCR and the LNT are widely used in after-treatment devices for diesel automobiles due to high purification performance.

FIG. 1 is a schematic diagram illustrating a conventional exhaust device for a diesel vehicle.

The conventional exhaust device for a diesel vehicle includes a DOC 20 connected to an engine 10 and a HC-SCR catalyst 30 connected to the DOC 20.

The DOC 20 mainly serves to oxidize hydrocarbons and CO, and is used to obtain a ratio of NO to $NO_2$ set to 1:1, which can raise the efficiency of a HC-SCR catalyst 30.

The HC-SCR catalyst 30 reduces NOx by controlling the ratio of hydrocarbon to NOx to be 5:1 or more by secondary fuel injection or engine post-injection in order to activate a reaction.

However, the afore-mentioned conventional HC-SCR catalyst 30 degrades its performance since it cannot maintain the ratio of hydrocarbon to NOx at 5:1 in the event where a diesel vehicle rapidly accelerates, decelerates, or changes gears, or descends down right after having climbed a hill.

Furthermore, regarding that the activation temperature of the HC-SCR catalyst 30 is typically 300° C. or more, the exhaust gas from the diesel automobile is relatively cool. This, as a result, causes another problem of poor purification performance.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY OF THE INVENTION

Various aspects of the present invention provide an exhaust device for a diesel vehicle, which is configured to improve low purification efficiency of a Hydrocarbon Selective Catalyst Reduction (HC-SCR) catalyst as well as to reduce both NOx and particulate matter.

In an aspect of the present invention, the exhaust device for a diesel vehicle may include a diesel fuel catalyst provided downstream of a turbocharger, a hydrocarbon Selective Catalyst Reduction (HC-SCR) catalyst provided downstream of the diesel fuel catalyst, a catalyst-coated diesel particulate filter provided downstream of the HC-SCR catalyst, and a secondary fuel injector provided on an exhaust gas pipe between the turbocharger and the diesel fuel catalyst.

Fuel, injected by the secondary fuel injector, may be decomposed into oxygen-containing hydrocarbon by the diesel fuel catalyst, and is then supplied to the hydrocarbon SCR catalyst, thereby purifying nitrogen oxides.

The exhaust device may further include a nitrogen oxide sensor provided downstream of the catalyst-coated diesel particulate filter, wherein the nitrogen oxide sensor detects an amount of nitrogen oxides in an exhaust gas.

An amount of oxygen-containing hydrocarbon, remaining after reaction in the hydrocarbon SCR catalyst, may react with soot trapped in the catalyst-coated diesel particulate filter, thereby oxidizing the soot.

The exhaust device may further include an electronic control unit responding to a signal applied from the nitrogen oxide sensor and outputting a control signal, which enables the secondary fuel injector to inject the fuel, at a regeneration point of a nitrogen oxide reduction catalyst where an amount of nitrogen oxides exceeding a reference amount is detected in the exhaust gas, wherein the amount of the nitrogen oxides is determined to exceed the reference amount in a case that the ratio of hydrocarbon to nitrogen oxide is below approximately 5:1.

According to various aspects of the present invention as set forth above, the exhaust device for a diesel vehicle can advantageously reduce both NOx and particulate matter using the DFC and the HC-SCR catalyst.

Accordingly, the exhaust device for a diesel vehicle has an effect capable of preventing deterioration in fuel economy while effectively removing NOx by improving reactivity.

The methods and apparatuses of the present invention have other features and advantages which will be apparent from or are set forth in more detail in the accompanying drawings, which are incorporated herein, and the following Detailed Description of the Invention, which together serve to explain certain principles of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

DETAILED DESCRIPTION OF THE INVENTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
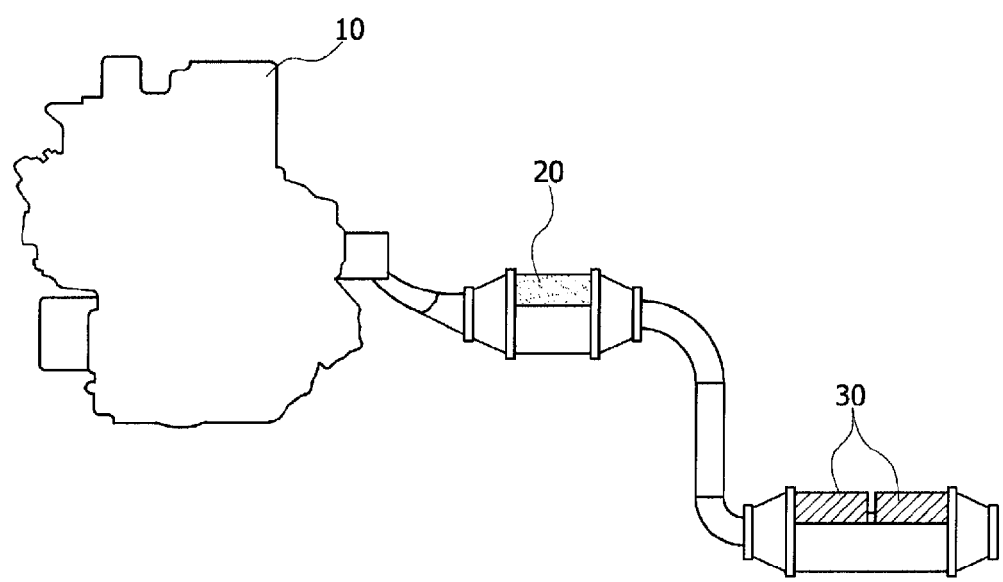
FIG. 1 is a schematic diagram illustrating a conventional exhaust device for a diesel vehicle.
Figure 2:
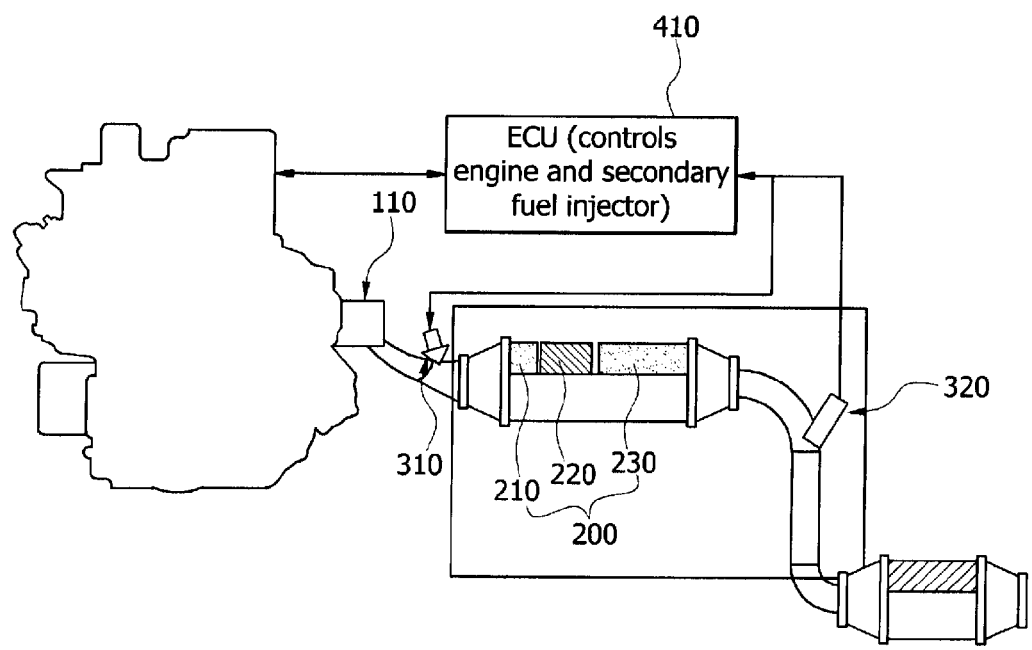
FIG. 2 is a schematic diagram illustrating an exhaust device for a diesel vehicle in accordance with an exemplary embodiment of the invention.

FIG. 2 is a schematic diagram illustrating an exhaust device for a diesel vehicle in accordance with an exemplary embodiment of the invention.

Referring to FIG. 2, the exhaust device for a diesel vehicle in accordance with an exemplary embodiment of the invention includes a catalyst unit 200 having a Diesel Fuel Catalyst (DFC) 210, a Hydrocarbon Selective Catalyst Reduction (HC-SCR) catalyst 220, and a Catalyst Coated-Diesel Particulate Filter (CC-DPF) 230. The DFC 210 is provided inside the catalyst unit 200, downstream of a turbocharger 110. The HC-SCR catalyst 220 is provided inside the catalyst unit 200, downstream of the DFC 210. The CC-DPF 230 is provided downstream of the HC-SCR catalyst 220, and is a Zoned Coated DPF (zCDPF). The exhaust device also includes a secondary fuel injector 310, a NOx sensor 320, and an Electronic Control Unit (ECU) 410. The secondary fuel injector 310 is provided downstream of the turbocharger 110 and upstream of the DFC 210, on a pipeline connecting between the turbocharger 110 and the DFC 210. The NOx sensor 320 is provided downstream of the DPF 230 to detect the amount of NOx in an exhaust gas. The ECU 410 responds to a signal applied from the NOx sensor 320, and outputs a control signal, which enables the secondary fuel injector 310 to inject fuel and an exhaust gas distribution valve to open, at a regeneration point of a NOx reduction catalyst where an amount of NOx exceeding a reference amount is detected in the exhaust gas.

The exhaust device in accordance with an exemplary embodiment of the invention having the above-described configuration can advantageously reduce both NOx and particulate matter using the DFC 210 and the HC-SCR catalyst 220.

Fuel, injected by the secondary fuel injector 310, is decomposed into oxygen-containing hydrocarbon by the DFC 210, and is then supplied to the HC-SCR catalyst 220, thereby purifying NOx.

Specifically, the secondary fuel injector 310 is provided upstream of the DFC 210 as a means for maintaining the minimum ratio of hydrocarbon to NOx at 5:1 or more in order to maximize the purification performance of the HC-SCR catalyst 220 according to driving conditions of a diesel engine, for example, in the event where a diesel vehicle rapidly accelerates, decelerates, or changes gears, or descends down right after having climbed a hill. According to driving conditions, the secondary fuel injector 310 can maintain the minimum ratio of hydrocarbon to NOx at 5:1 or more by injecting a specific amount of fuel when the ratio of hydrocarbon to NOx is below 5:1.

The fuel, injected by the secondary fuel injector 310, does not directly react with the HC-SCR catalyst 220 but is converted by the DFC 210, upstream of the HC-SCR catalyst 220, into oxygen-containing hydrocarbon that has good reactivity with the HC-SCR catalyst 220.

Specifically, the DFC 210 disconnects long carbon chains of diesel fuel to form a number of short hydrocarbons, which can improve reactivity due to an increased effective surface area for reaction. This, as a result, can form functional groups or double bonds or convert the diesel fuel into $H_2/CO$.

Accordingly, the exhaust device in accordance with an exemplary embodiment of the invention can prevent deterioration in fuel economy and effectively remove NOx by improving reactivity.

After oxygen-containing hydrocarbon, produced from the fuel injected to adjust the ratio of hydrocarbon to NOx, reacts with the HC-SCR catalyst 220, a remaining amount of oxygen-containing hydrocarbon reacts with soot, trapped in the CC-DPF 230 downstream of the HC-SCR catalyst 220, thereby oxidizing the soot.

In addition, the NOx sensor 320 is provided downstream of the catalyst unit 200, inside of which the DFC 210, the HC-SCR catalyst 220, and the CC-DPF 230 are installed, in order to determine a purifying point.

The DFC 210 is located upstream of the HC-SCR catalyst 220 to buff and distribute an exhaust gas having an irregular current pattern, emitted from an exhaust manifold, so that the exhaust gas can be uniformly supplied to the HC-SCR catalyst 220.

The ratio of hydrocarbon to NOx is estimated based on a value measured by the NOx sensor 320 downstream of the DPF and a value measured by a lambda sensor (not shown) mounted on an engine exhaust port.

As described above, the exhaust device in accordance with an exemplary embodiment of the invention can reduce both NOx and particulate matter using the DFC and the HC-SCR catalyst.

Accordingly, the exhaust device in accordance with an exemplary embodiment of the invention has an effect capable of preventing deterioration in fuel economy while effectively removing NOx by improving reactivity.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An exhaust device for a diesel vehicle comprising:
   a diesel fuel catalyst provided downstream of a turbocharger;
   a hydrocarbon Selective Catalyst Reduction (HC-SCR) catalyst provided downstream of the diesel fuel catalyst;
   a catalyst-coated diesel particulate filter provided downstream of the HC-SCR catalyst; and
   a secondary fuel injector provided on an exhaust gas pipe between the turbocharger and the diesel fuel catalyst;

a nitrogen oxide sensor provided downstream of the catalyst-coated diesel particulate filter, wherein the nitrogen oxide sensor detects an amount of nitrogen oxides in an exhaust gas; and an electronic control unit configured to respond to a signal applied from the nitrogen oxide sensor and output a control signal, which enables the secondary fuel injector to inject a specific amount of fuel where an amount of nitrogen oxides exceeding a reference amount is detected in the exhaust gas, wherein the amount of nitrogen oxides is determined to exceed a reference amount in a case that a ratio of hydrocarbon to nitrogen oxide is below 5:1;

wherein fuel, injected by the secondary fuel injector, is decomposed into oxygen-containing hydrocarbon by the diesel fuel catalyst, and is then supplied to the hydrocarbon SCR catalyst, thereby purifying nitrogen oxides;

after oxygen-containing hydrocarbon reacting with the HC-SCR catalyst, a remaining amount of oxygen-containing hydrocarbon reacting with soot, trapped in the CC-DPF downstream of the HC-SCR catalyst, thereby oxidizing the soot.

* * * * *